US006418914B1

(12) United States Patent
Gibson et al.

(10) Patent No.: US 6,418,914 B1
(45) Date of Patent: Jul. 16, 2002

(54) CONSTRAINT IDLER

(75) Inventors: Robert C. Gibson; Kevin J. Knox, both of Peoria; Marvin P. Schneider, East Peoria; Michael J. Smith, Dunlap; Lloyd E. Thompson, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/728,465

(22) Filed: Dec. 1, 2000

(51) Int. Cl.[7] .......................... F16H 55/18; F02M 47/00

(52) U.S. Cl. ...................... 123/508; 74/409; 123/90.31; 239/88

(58) Field of Search .............................. 123/90.31, 508; 239/88–91, 533.2; 74/409, 410, 411, 440

(56) References Cited

U.S. PATENT DOCUMENTS

| | | | | |
|---|---|---|---|---|
| 1,148,478 A | * | 7/1915 | Jepson | 123/90.31 X |
| 3,152,584 A | * | 10/1964 | Petroff | 123/508 |
| 5,272,937 A | | 12/1993 | Brosowske et al. | |

* cited by examiner

*Primary Examiner*—Tony M. Argenbright
(74) *Attorney, Agent, or Firm*—Robert J. Hampsch; Larry G. Cain

(57) ABSTRACT

At least two torque paths between a driver and a camshaft distribute dynamic torque applied to the camshaft, allowing for cancellation of undesirable torque components. The second torque path has a greater number of gears than the first torque path, and acts as a constraint on the camshaft, ameliorating discontinuities in camshaft rotation due to sudden changes in load on the camshaft.

18 Claims, 3 Drawing Sheets

Fig. 4
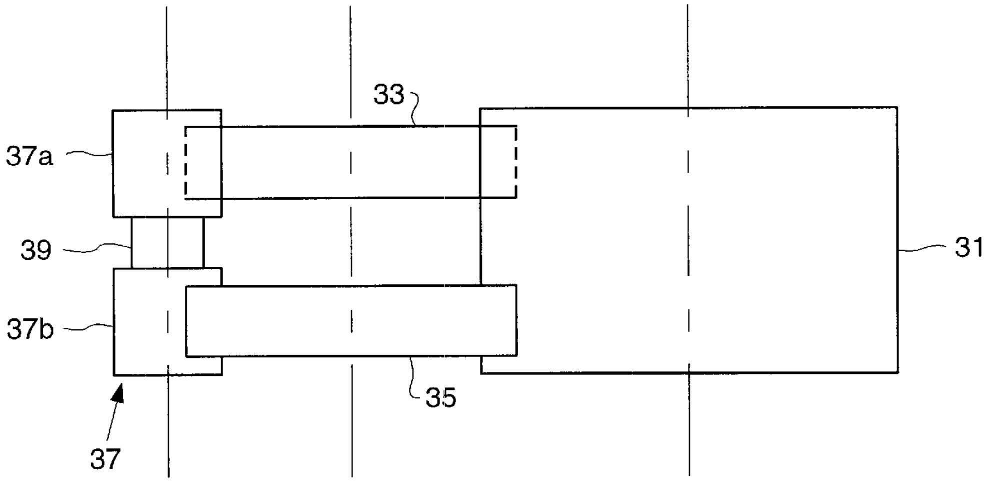
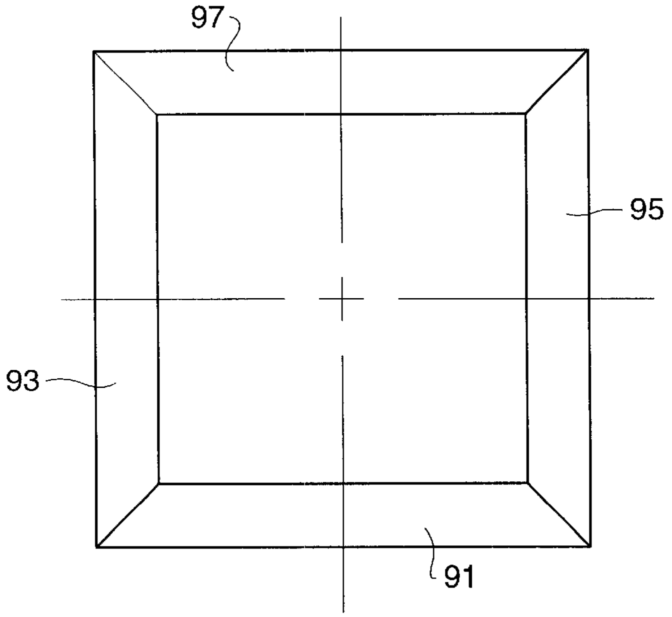
Fig. 5

CONSTRAINT IDLER

TECHNICAL FIELD

This invention relates generally to engines, and more particularly to gear trains in engines for driving mechanically actuated fuel injectors.

BACKGROUND ART

Diesel engines are required to meet ever-reducing emission levels. Increasing the pressure to spray the fuel into the cylinders is one method of reducing emissions. Increased injection pressure requires additional torque to drive the injection system. The increased drive torque caused by high injection pressures in the unit injector fuel systems causes high-load gear impacts that generate considerable noise and occasionally mechanical failure of the gears.

For example, typically fuel pressurization in a mechanically actuated fuel injector is achieved by downward pressure on a plunger in the fuel injector. A cam operates an arm to push down on the plunger. The cam is driven by a driver gear or a driver idler gear engaged with and rotating a cam gear. While the cam is pushing against the arm to pressurize fuel tremendous force is being applied by the driver or driver idler gear against the cam gear.

When the fuel injector releases the pressurized fuel the pressure on the plunger is suddenly eliminated. With the sudden cessation of return force from the cam gear against the driver gear, the cam gear may be propelled violently forward so that the cam gear teeth can fly off the driver gear teeth and actually slam into the respective driver gear teeth in front of them. This causes considerable noise, and also contributes to gear wear.

Further, gear train strength has been increased with a change from helical gears to high contact ratio spur gears. Accordingly, the width of the gears has been increased. With every increase in injection pressure the gear loads and noise tend to increase. Accordingly it has become difficult to provide acceptable mechanical reliability with a low noise level in these gear trains with the increase in injection pressure. Larger and stronger gears, when used, cause dynamic problems of their own with their significantly increased inertia. A solution is needed to reduce the impact loads in these gear trains and otherwise address these problems.

Various techniques, including the use of torsional (viscous or rubber) dampers, absorbers, split or scissors gears, and gear backlash control techniques, have been tried. For example, U.S. Pat. No. 5,272,937 teaches an active inertia torque absorber.

These techniques have some problems. For example, the absorber and damper strategies either absorb and return the dynamic energy, or dissipate it as heat. Both of these devices have limited capacity for reducing torque. Furthermore, the added inertia of their mechanisms can increase the dynamic input. Additionally, their size can increase the weight and volume of the engine, which affects packaging and fuel economy.

Backlash control techniques with split or scissors gears can reduce the impact loads, but require a spring to force the two gears to opposite sides of the mesh. The spring in the split gear must be strong enough to be effective, yet not so forceful as to add excessive friction to the system. The split gear spring can be optimized at only one operating condition. The split gear technique requires additional axial length for packaging. Designing and producing a split gear backlash limiting system is difficult, and therefore expensive.

DISCLOSURE OF THE INVENTION

In a first aspect of the invention, a gear train in an engine comprises a driver, a cam, a first torque path between the driver and the cam including a first number of idlers between the driver and the cam, and a second torque path between the driver and the cam including a second number of idlers between the driver and the cam. The first number is at least zero, and the second number is greater than the first number.

In a second aspect of the invention, a method for regulating motion of a cam in an engine comprises providing a driver mechanically connected with the cam via a first torque path to provide a motive force for rotating the cam, and providing a second torque path, distinct from the first torque path, between the driver and the cam, such that rotational torque from the driver is applied to the cam at first and second respective locations on the cam. The second torque path includes a greater number of gears than the first torque path. The second torque path provides a constraint on the cam to check a sudden change in rotation speed of the cam due to a sudden change in load on the cam.

BRIEF DESCRIPTION OF THE DRAWINGS

The invention is described herein with reference to the drawing of embodiments of the invention, in which:

FIG. 4 is a representational drawing of a drive train configuration according to a third embodiment of the invention; and FIG. 5 is a representational drawing of a box-gear configuration adaptable to various embodiments of the invention.

BEST MODE FOR CARRYING OUT THE INVENTION

Figure 1:
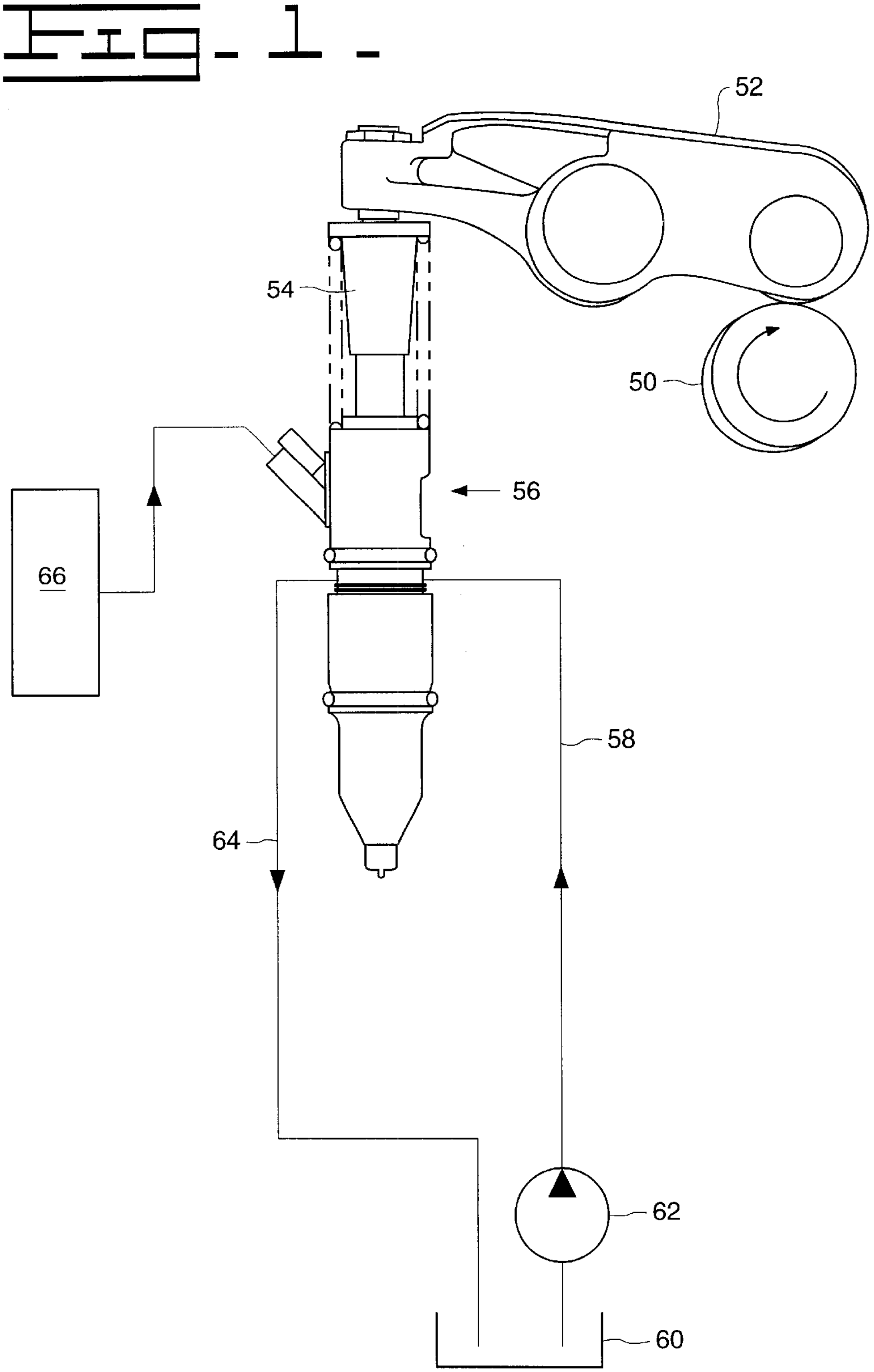
FIG. 1 is a representational drawing of a cam and fuel injector configuration adaptable to the invention.

With reference to FIG. 1, a cam 50 engages a pivot arm 52 disposed to push down on a plunger 54 of a fuel injector 56. A fuel supply passage 58 fluidly connects a fuel tank 60 with the fuel injector 56 via a fuel transfer pump 62. A fuel drain passage 64 fluidly connects the fuel injector 56 with the fuel tank 60. An electronic control module 66 can control fuel injection timing and other variables for operating the fuel injector 56.

Figure 2:
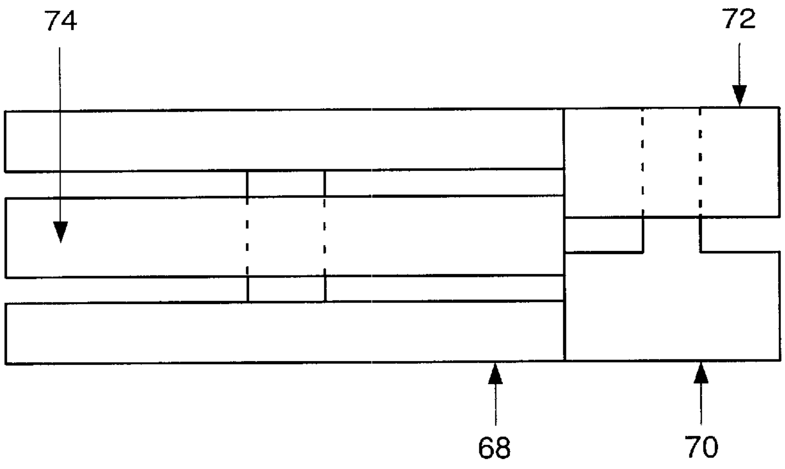
FIG. 2 is a representational drawing of a drive train configuration according to a first embodiment of the invention.

With reference to FIG. 2, in one embodiment of the invention a driver or drive idler 68 directly engages a cam 70. The driver or drive idler 68 also engages a first constraint idler 72 that in turn engages a second constraint idler 74. The second constraint idler 74 in turn engages the cam 70.

Figure 3:
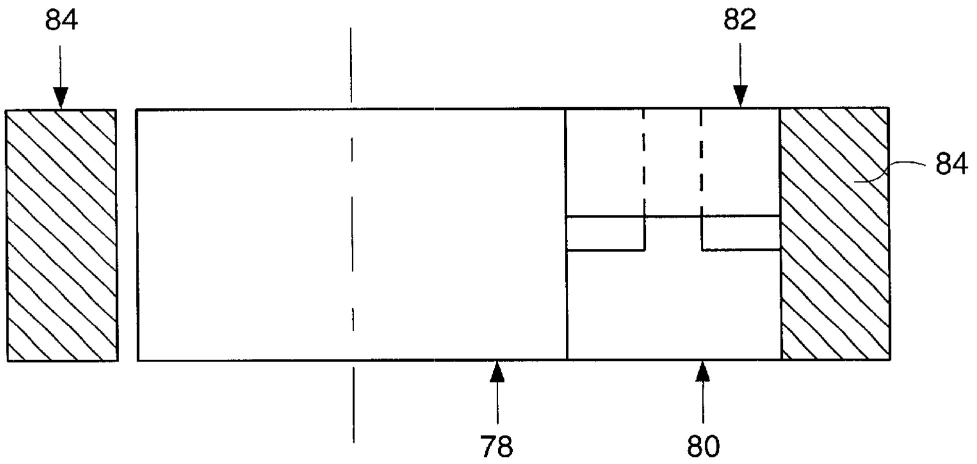
FIG. 3 is a representational drawing of a drive train configuration according to a second embodiment of the invention.

With reference to FIG. 3, in a second embodiment of the invention a driver or drive idler 78 directly engages a cam 80. The driver or drive idler 78 also engages a first constraint idler 82 that in turn engages a second constraint idler 84 in the form of a planetary idler 84. The second constraint idler 84 in turn engages the cam 80.

With reference to FIG. 4, in a third embodiment of the invention a drive idler 31 engaged by a drive gear (not shown) engages both a cam 33 and a first idler 35. (Alternatively, of course, the drive gear could engage the cam 33 and the first idler 35 directly.) A split gear constraint idler 37 engages both the cam 33 and the first idler 35.

A first half 37*a* of the split gear constraint idler 37 engages the cam 33, while a second half 37*b* of the split gear constraint idler 37 engages the first idler 35. The two halves 37*a,* 37*b* of the split gear constraint idler 37 are connected by a torsion member 39 that allows a small, predetermined variation in rotational position between the two halves, while providing a torsional force biasing the two halves to the same rotational position.

FIG. 5 shows an example possible "box gear" configuration for various embodiments of the invention. For example, a driver or drive idler 91 can engage a cam 93 directly, while simultaneously engaging the cam 93 from a different direction via a first constraint idler 95 and a second constraint idler 97.

INDUSTRIAL APPLICABILITY

The illustrated embodiments modify a gear train by including separate torque paths of unequal length between a source of dynamic load and a cam. This has the effect of more broadly distributing the dynamic torque, and allows for cancellation of that torque.

With reference to FIG. 1, fuel from the fuel tank 60 is generally pumped into the fuel injector 56 via the fuel supply passage 58 by the low-pressure fuel transfer pump 62. As the cam 50 rotates, a projection on the cam 50 pushes one end of the pivot arm 52 upward. This causes the other end of the pivot arm 52 to push downward on the plunger 54. This pressurizes the fuel in the fuel injector 56. Because of the great pressures needed for high pressure fuel injection, the force provided by the cam 50 to push the plunger 54 downward can be very great. In order to generate this force, a crankshaft must exert a very high level of torque on the cam 50, for example via a driver gear.

To start fuel injection, the electronic control module 66 releases the highly pressurized fuel in the fuel injector 56. This causes resistance to pushing the plunger 54 downward to effectively disappear, and the great force being applied to the cam 50 by the driver would cause the cam 50 to jump ahead if there were no other constraining force on the cam 50.

In gear train arrangements according to the invention such as in FIGS. 2–5, the driver or driver idler 31, 68, 78, 91 is applying torque to rotate the cam 33, 70, 80, 93, usually causing gear teeth on the driver 31, 68, 78, 91 to engage gear teeth at a first position on a gear of the cam 33, 70, 80, 93. However, the driver or drive idler 31, 68, 78, 91 is also applying torque to rotate the first constraint idler 35, 72, 82, 95. This torque translates through the second constraint idler 37, 74, 84, 97 to act on the cam 33, 70, 80, 93 as well, at a second position on the gear of the cam 33, 70, 80, 93. The cam 33, 70, 80, 93 generally includes a camshaft and different portions of the cam 50 can operate a plurality of fuel injectors 56 with injection times staggered from one another.

It has been discovered that when there is a sudden release of resistance against the cam 33, 50, 70, 80, 93 as described above, the two torque paths of unequal length provide a restraint tending to keep the cam 33, 50, 70, 80, 93 from jumping violently ahead. It was unexpectedly discovered that using torque paths of unequal length works better for this purpose than using torque paths of equal length, for example using two separate idlers between a driver and a cam, each of the idlers forming a separate respective torque path between the driver and the cam.

With reference to FIG. 4, by using a split gear constraint idler 37 as the first and/or second constraint idler, a non-loaded torsion member 39 can provide some rotational leeway between the first half 37*a* of the constraint idler 37 constraining the cam 33 and the second half 37*b* of the constraint idler 37. This may be useful in some configurations, depending on gear tolerance and other design parameters.

The constraint idler or constraint idler gear of the invention may typically be a toothed gear, but could also be a friction belt, a sprocket-driven belt, a sprocket-driven chain, or such, or a combination thereof used in conjunction with or in place of a toothed gear.

The invention is not limited to the disclosed embodiments. For example, one or more configurations of this invention disclosed herein have one driving gear, a cam, and two constraint idler gears. The gears may optionally be on separate parallel shafts, and may optionally be aligned in a single plane. The driving and driven gears are directly in contact. Various embodiments of the invention may include different numbers of driving, driven, and idler gears. Additional idler gears may separate the driving and driven gears. Further, the term "cam" used herein indicates a camshaft including gears and such mounted thereon that is loaded to drive a device.

The gears may be placed at various locations along their supporting shafts rather than aligned in one plane. The gear shafts may be aligned at various angles (as per bevel, worm, and crossed helical gears), and several gears may occupy a single shaft. The elements of the gear train may be divided among several gears. For example, one or both of the constraint idler gears could be split into two gears separated by a flexible coupling in which one side contacts the driving gear and the other side contacts the driven gear.

Additionally, while the illustrated embodiments have the driver gear directly engaging the cam as one torque path, and two constraint idler gears in a second torque path, other non-illustrated embodiments could have idler gears in both torque paths, and/or may use more than two torque paths.

Further, while in the illustrated embodiments the cams are used with fuel injectors, the invention may be practiced with cams that drive other mechanisms as well. For example, It is common practice to drive pumps, compressors, alternators, electric motors, etc. using the same gear train that drives a fuel injector. The cam could be "loaded" with other types of devices as well.

Accordingly, while the invention has been illustrated and described in detail in the drawings and foregoing description, such illustration and description are to be considered illustrative or exemplary and not restrictive; other variations to the disclosed embodiments can be made by those skilled in the art while practicing the claimed invention from a study of the drawings, the disclosure, and the appended claims.

What is claimed is:

1. A gear train in an engine, comprising:

a driver;

a cam;

a first torque path between the driver and the cam including a first number of idler gears between the driver and the cam, the first number being at least zero;

a second torque path between the driver and the cam including a second number of idler gears between the driver and the cam, the second number being greater than the first number; and one of the torque paths includes at least one of a friction belt, a sprocket-driven belt, and a sprocket-driven chain.

2. The gear train of claim 1, wherein the second torque path includes a split gear.

3. The gear train of claim 1, wherein the second torque path includes a toothed gear.

4. The gear train of claim 1, wherein the cam is disposed to drive a pressurization member of a fuel injector.

5. The gear train of claim 1, wherein the cam is disposed to drive respective pressurization members of a plurality of respective fuel injectors.

6. The gear train of claim 1, wherein the cam operates to provide a force to operate a device.

7. The gear train of claim 1, wherein the cam operates to provide a force to operate a plurality of devices.

8. A method for regulating motion of a cam in an engine, comprising:

providing a driver mechanically connected with the cam via a first torque path to provide a motive force for rotating the cam; and providing a second torque path, distinct from the first torque path, between the driver and the cam, such that rotational torque from the driver is applied to the cam at first and second respective locations on the cam, the second torque path including a greater number of gears than the first torque path, such that said second torque path provides a constraint on the cam to check a sudden change in rotation speed of the cam due to a sudden change in load on the cam.

9. The method of claim 8, wherein said cam operates to provide pressurization of fuel in a fuel injector.

10. The method of claim 8, wherein said cam operates to provide pressurization of fuel in a plurality of fuel injectors.

11. The method of claim 8, wherein the cam operates to provide a force to operate a device.

12. The method of claim 8, wherein the cam operates to provide a force to operate a plurality of devices.

13. A gear train in an engine, comprising:

a driver;

a cam;

a first torque path between the driver and the cam including a first number of idler gears between the driver and the cam, the first number being at least zero; and a second torque path between the driver and the cam including a second number of idler gears between the driver and the cam, the second number being greater than the first number, and the second torque path includes a split gear.

14. The gear train of claim 13, wherein the second torque path includes a toothed gear.

15. The gear train of claim 13, wherein the cam is disposed to drive a pressurization member of a fuel injector.

16. The gear train of claim 13, wherein the cam is disposed to drive respective pressurization members of a plurality of respective fuel injectors.

17. The gear train of claim 13, wherein the cam operates to provide a force to operate a device.

18. The gear train of claim 13, wherein the cam operates to provide a force to operate a plurality of devices.

* * * * *